UNITED STATES PATENT OFFICE.

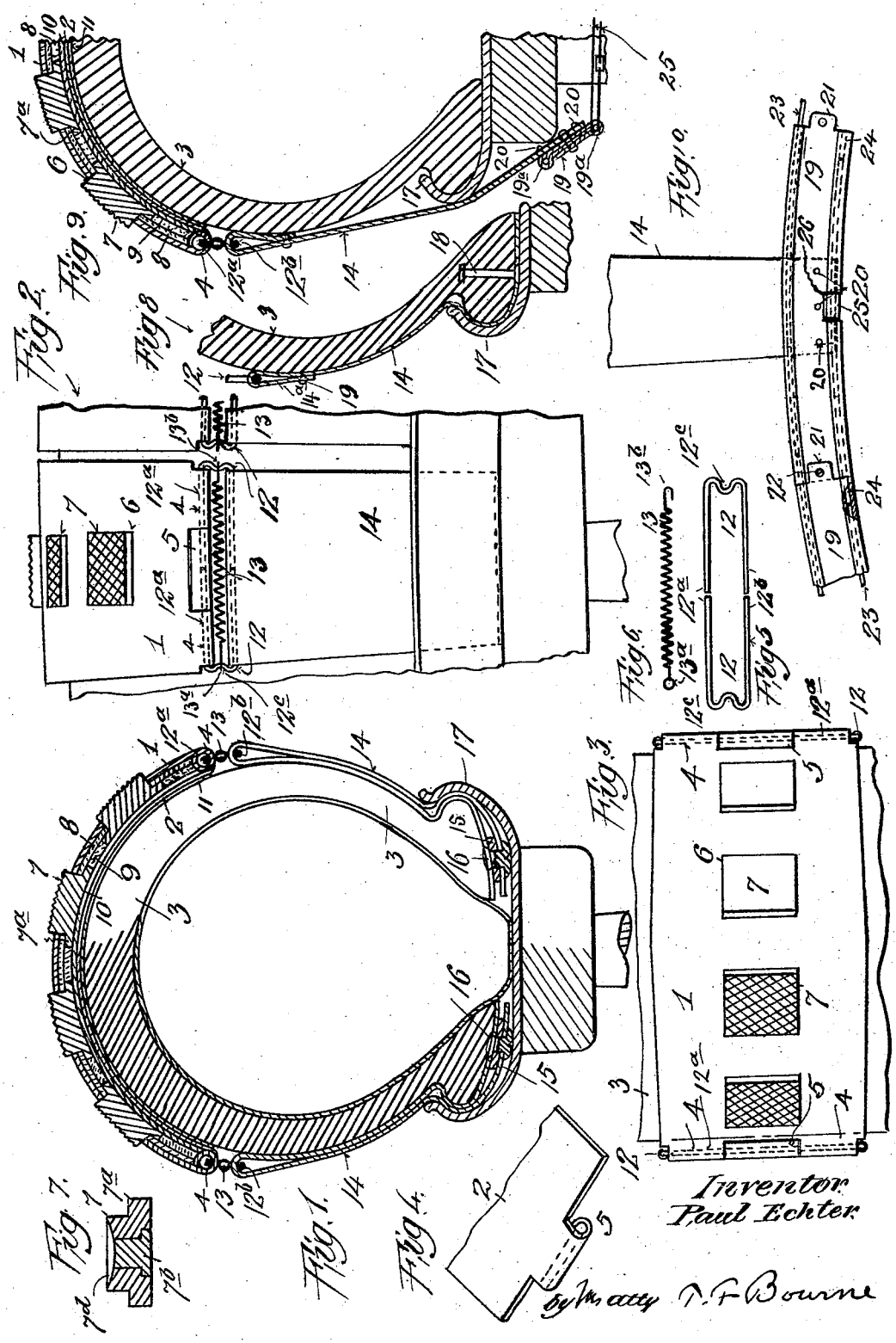

PAUL ECHTER, OF NEW YORK, N. Y.

TIRE PROTECTOR.

1,414,632.

Specification of Letters Patent. Patented May 2, 1922.

Application filed January 2, 1919. Serial No. 269,291.

*To all whom it may concern:*

Be it known that I, PAUL ECHTER, a citizen of Russia, and resident of New York, in the county of New York and State of New York, have invented certain new and useful Improvements in Tire Protectors, of which the following is a specification.

The object of my invention is to provide a protector for tires adapted for preventing punctures, and reduce damage from skidding, and which may be readily applied to and detached from tires. The protector is shown provided with detachable projections which may be replaced when worn out and which will serve to resist skidding.

My invention comprises novel details of improvement and combinations of parts that will be more fully set forth and then pointed out in the claims.

Reference is to be had to the accompanying drawings forming a part hereof in which—

Figure 1 is a cross section of a tire equipped with my improvements;

Fig. 2 is a side view of Fig. 1, showing a portion of a tire with my improvements thereon;

Fig. 3 is a plan view;

Fig. 4 is a detail of a portion of the inner member of the protector;

Fig. 5 is a detail of members 12;

Fig. 6 is a detail of a spring for connecting the last named members;

Fig. 7 is a sectional detail of a modification;

Fig. 8 is a sectional detail showing modified means for retaining the protector upon the tire;

Fig. 9 is a sectional view of a further modification; and

Fig. 10 is a side view of a portion of Fig. 9.

Similar numerals of reference indicate corresponding parts in the several views.

At 1 is indicated an outer member and at 2 the inner member of my improved protector which may be adapted to fit over a tire 3. Said members may be of suitable dimensions to protect desired portions of the tire and preferably of relatively thin sheet metal in plate-like form. Said members are detachably connected together for which purpose I have shown the member 1 provided with eyes 4 at its edges, which may be coiled from the metal of member 1 and spaced apart to receive the corresponding eyes 5 respectively at the opposite ends of the inner member 2. The outer member 1 is provided with any desired number of holes 6 through which studs or projections 7 project. Said studs or projections are shown provided with inner flanges 7$^a$ which are suitably located between spaced members 1 and 2 to retain the studs 7 in position. Filling means may be provided between members 1 and 2, such as the outer layer 8 of fabric, cork or the like against the inner surface of member 1 and the inner layer 9 of fabric, cork or the like against the outer surface of member 2. The layer 8 has holes through which the main parts of studs 7 project and whereby said layer overlies the flanges 7$^a$ of said studs, and the inner layer 9 has holes receiving the flanges 7$^a$ whereby the parts are compactly united. The layers 7 and 8 are adapted to act like pads and reduce noise. At 10 is a layer of fabric or the like over the inner member 2 against which the studs 7 and layer 9 may rest. At 11 is an inner layer of fabric or the like within member 2 bearing against the tire to reduce wear thereon, and avoid noise. Means are provided to unite the eyes 4 and 5 of the members 1 and 2 to retain them together in use, and also to serve as a part of means for retaining the protector on the tire. I have shown retainers 12 having spaced arms 12$^a$, 12$^b$. The arms 12$^a$ of each retainer are respectively adapted to enter the eye 4 at the corresponding ends of member 1 and the interposed eye 5 of member 2, whereby the members 1 and 2 of each section of the protector will be united. Means are provided to keep said retainers in position in respect to the eyes 4 and 5 and permit ready removal of said retainers. I have illustrated a connector 13 for such purpose which is shown in the form of a wire interposed between the two opposing retainers 12, which wire preferably will be in the form of a spiral spring. The retainers 12 are shown provided with recesses 12$^c$ at their ends receiving the ends of the connector 13. Said connector may be coiled at 13$^a$ around the recessed portion 13$^c$ of one retainer and the opposite end of the connector may be in the form of a hook at 13ᵇ adapted to be readily attached to and detached from the recessed part 12ᶜ of the companion retainer.

The retainers 12 are adapted to be connected to straps 14 for which purpose said straps may be looped to receive the arms 12ᵇ of the retainers. The said straps may be of canvas, leather or other suitable material and may be attached to the tire or wheel at the ends opposite the retainers in any desired manner. In Figs. 1 and 2 the ends of straps 14 are attached to a band or strip 15 by rivets 16 and said ends of the straps with the said bands are shown located within the wheel rim 17 against the beads of the tire. The straps extend from the rim along the sides of the tire to the retainers 12. Each protector may be provided with a metal band or strip 15, or said bands or strips may be continuous around the inner edges of the beads of the tire whereby a series of protectors may be united together.

The sections of the protector described may be attached upon the tire in any suitable spaced relation around the same. When it is desired to apply or remove the sections the retainers 12 may be adjusted to the straps or removed therefrom, as required. In case it is desired to replace one or more of the studs or projections 7 of a section of the protector it is merely necessary to remove the corresponding retainers 12, spread the members apart, remove and reinsert the stud or studs, and readjust the protector section in connection with the straps by the retainers 12.

The studs 7 may be of rubber or any suitable material. In several figures the studs 7 are shown of a single piece of material. In Fig. 7 the studs are shown comprising an outer section provided with a central aperture and an inner section 7ᵇ in the nature of a block inserted in said aperture and provided with a flange 7ᶜ that enters a recess in the inner surface of the stud. The outer section of the stud may be of rubber or metal and the inner section of a different material such as wood or rubber. The surfaces of the studs may be smooth or serrated, or any other desired form. In Fig. 7 the outer end of the stud is shown recessed at 7ᵈ whereby when the stud is made of solid rubber the recess will operate in the nature of a vacuum cup.

Instead of having the ends of the straps 14 secured to the strip 15 to be located between the bead of the tire and the wheel rim said strap may be riveted to the bead as shown in Fig. 8, and the rivet 18 may be buried in the bead of the tire. The strap 14 in Fig. 8 is shown in a single ply having its portion 1ᵃ riveted to the main portion at 18.

Instead of having the straps 14 at their outer ends arranged as shown in Figs. 1 and 8 they may be retained along the wheel in any suitable manner, such as illustrated in Figs. 9 and 10. I have shown strips 19, preferably suitably curved to correspond with the arc described around the axis of the wheel, to which strips the corresponding straps 14 may be secured, as by rivets 20. The strips 19 may be of any desired length capable of having one or more straps 14 attached thereto, and a series of such strips 19 may be connected together in circular form, on the opposite sides of the wheel. For convenience each strip 19 may be provided with ears 21 which are adapted to overlap the adjacent end of the succeeding strip and to be secured thereto by screws 22. As additional means of connection of the strips 19 the same are shown coiled at their edges at 19ᵃ and wires 23 are located in said coils. The said wires may be of substantially the same length as the corresponding strip 19 and positioned in the coils 19ᵃ in such a manner that one end of the wire 23 will project beyond the end of the corresponding strip 19 providing a space 24 in said coil at the opposite end of the strip whereby the projecting end of one wire enters the space 24 in the coil of the adjacent strip 19, and so on continuously around the series of strips. The arrangement is such that the wires 23 at one edge of the strip project from one end and on the other edge of the same strip project from the opposite end thereof, providing corresponding spaces 24 at the opposite ends of the wires at the opposite ends of the strips, (Fig. 10). The strips 19 may be connected to the wheel, as to spokes, or the opposing strips 19 on opposite sides of the wheel may be connected together, as by straps or links 25. I have shown strip 19 provided with a recess or cut-away part at 26 exposing the adjacent portion of the corresponding wire 23, whereby the strap or link 25 may be looped over the wire through recess 26. The recess 26 in strips 19 on opposite sides of the wheel may oppose each other so that the strap or link 25 may connect the corresponding wires on opposite sides of the wheel, the ends of the strap being connected together by a buckle or in any desired manner. The arrangement is such that the straps 14 may be connected together in a detachable manner on the exterior of the wheel without regard to the rim 17, whereby any section may be removed when desired. In Figs. 9 and 10 either section of the protector may be removed and replaced by manipulating the retainers 12 while the straps 14 with their attaching means 19, 23, and 25 remain in position upon the wheel.

While I have shown my improvements as applied upon pneumatic tires it will be understood that they may be applied upon so-called solid rubber tires. My improvements afford means for protection against puncturing tires and cutting the wearing surfaces thereof due to the road conditions, as well as affording non-skid means, since the wearing surface of the tire bears against a smooth inner surface of the protector and danger of injury to the wearing surface of the tire by non-skid devices is avoided.

Having thus described my invention, what I claim and desire to secure by Letters Patent is:—

1. An anti-skid tire protector comprising spaced opposing outer and inner members, the outer member being provided with holes, detachable studs projecting through said holes, flanges on the studs for retaining the inner parts of said studs detachably between said members, and a pad of material between said members and surrounding the flanges of said studs.

2. An anti-skid tire protector comprising outer and inner members in plate like form spaced apart, said members having eyes at their ends, retainers having arms adapted to be detachably fitted in said eyes, to connect the outer and inner members, said retainers having other arms spaced from the first named arms and from said members to receive straps.

3. An anti-skid tire protector comprising outer and inner members in plate like form spaced apart, said members having eyes at their ends, studs retained between said members, opposing retainers having arms adapted to be detachably fitted in complemental eyes at corresponding ends of said members to connect the outer and inner members, said retainers having other arms spaced from the first named arms and from said members to receive straps, and means connecting opposing retainers together to maintain the retainers in connection with the corresponding eyes.

4. An anti-skid tire protector comprising outer and inner members in plate like form spaced apart, said members having eyes at their ends, studs retained between said members, opposing retainers having arms adapted to be detachably fitted in said eyes to connect the outer and inner members, said retainers having other opposing arms spaced from said members to receive straps, and a spring connection between complemental opposing retainers to keep them from spreading apart.

5. An anti-skid device for tires comprising spaced outer and inner curved plate like members having eyes at their ends to register, the outer member having holes, studs removably retained in said holes and retainers having substantially parallel spaced arms, arms of two retainers at the ends of said members being located in said eyes, and other arms of said retainers being spaced from said members to receive straps.

6. An anti-skid tire protector comprising inner and outer spaced continuous curved members, said members having eyes at their ends extending at an angle to the length of the members, and retainers fitted detachably in said eyes to permit ready separation of said members, said retainers opposing each other at the corresponding ends of said members, and means detachably connecting said retainers.

Signed at New York in the county of New York and State of New York this 31st day of December, A. D. 1918.

P. ECHTER.